United States Patent [19]

Levy

[11] Patent Number: 4,891,715

[45] Date of Patent: Jan. 2, 1990

[54] DIGITAL VIDEO SIGNAL PROCESSING WITH CUT EDITING FEATURE

[75] Inventor: David F. Levy, Andover, England

[73] Assignee: Sony Corporation, Tokyo, Japan

[21] Appl. No.: 154,229

[22] Filed: Feb. 10, 1988

[30] Foreign Application Priority Data

Feb. 18, 1987 [GB] United Kingdom ............... 8703730

[51] Int. Cl.[4] .................. G11B 27/02; H04N 5/91; H04N 5/76
[52] U.S. Cl. ................... 360/14.1; 358/311; 358/22; 358/160; 358/185; 360/33.1
[58] Field of Search ............. 358/311, 335, 337, 339, 358/21 R, 22, 160, 185, 908, 213.25; 360/14.1–14.3, 31, 32, 33.1, 36.1, 36.2, 39, 52, 9.1; 382/57; 364/200 MS File, 900 MS File; 365/189.01, 189.04, 233

[56] References Cited

U.S. PATENT DOCUMENTS

| 4,134,128 | 1/1979 | Hurst | 358/160 X |
| 4,172,264 | 10/1979 | Taylor et al. | 358/185 |
| 4,346,403 | 8/1982 | Tamura | 358/185 X |
| 4,394,745 | 7/1983 | Menezes et al. | 360/14.1 X |
| 4,467,370 | 8/1984 | Hoshino et al. | 360/14.1 X |
| 4,685,003 | 8/1987 | Westland | 360/31 X |
| 4,698,664 | 10/1987 | Nichols et al. | 358/22 X |
| 4,706,135 | 11/1987 | Kojima | 360/14.1 |
| 4,785,359 | 11/1988 | Hickok | 360/36.2 X |
| 4,797,743 | 1/1989 | Miyazaki | 358/160 X |

Primary Examiner—Alan Faber
Assistant Examiner—W. R. Young
Attorney, Agent, or Firm—Lewis H. Eslinger; Jay H. Maioli

[57] ABSTRACT

A method of and apparatus for processing a digital video signal to effect cut editing is disclosed. The method comprises storing a segment of an input digital video signal in a random access memory, the digital video signal being repetitively written in the memory at a standard speed, writing proceeding cyclically from the start of the memory to the finish of the memory, then returning to the start of the memory, and reading the digital video signal from the memory at the standard speed, the reading normally lagging behind writing by an amount substantially equal to the capacity of the memory, which may be several seconds. The read digital video signal is cut edited by step reducing the amount by which reading lags behind writing, and subsequent to a cut edit the reading speed is reduced below the standard speed until the amount by which reading lags behind writing is restored to the normal amount. The read digital video signal is supplied to interpolation filters to restore the frame frequency of the read digital video signal to the frame frequency corresponding to the standard speed.

10 Claims, 1 Drawing Sheet

DIGITAL VIDEO SIGNAL PROCESSING WITH CUT EDITING FEATURE

BACKGROUND OF THE INVENTION

1. Field of the Invention

This invention relates to digital video signal processing methods and apparatus. Embodiments of the invention are particularly, but not exclusively, intended for use in broadcasting studios.

2. Description of the Prior Art

A digital slow motion processor comprising a large random access memory capable of storing several seconds of a digital video signal and operating cyclically has been proposed by us for use in broadcasting studios. Thus, by placing the slow motion processor in parallel with a transmission or recording path, that is between a video camera and a transmitter or a recorder, the last few seconds of the transmitted or recorded signal is always available in the memory. In the case, for example, of a sports broadcast, the input to the memory can be cut at the end of a particular bit of action, and the slow motion processor can then read out the stored few seconds of the digital video signal including the bit of action for repeated transmission or recording. The readout will usually be at a non-standard speed, most usually in slow motion, and the slow motion processor includes adaptive interpolation filters of known form to do the necessary field rate conversion to provide an appropriate sequence of fields at the system field frequency for transmission or recording.

The present invention is concerned with an adaptation of the form and use of apparatus similar to such a slow motion processor to permit cut editing; that is, to permit omission from transmission or recording of small unwanted portions of a digital video signal being received from a live source such as a video camera.

OBJECTS AND SUMMARY OF THE INVENTION

One object of the present invention is to provide a method of processing a digital video signal whereby a small unwanted portion of the signal can be omitted without the omission being perceptible to a viewer.

Another object of the present invention is to provide a digital video signal processing apparatus which can omit a small unwanted portion of a video signal without the omission being perceptible to a viewer.

According to the present invention there is provided a method of processing a digital video signal, the method comprising:

storing a segment of an input digital video signal in a random access memory;

writing said input digital signal in said memory at a standard speed, writing proceeding cyclically from the start of said memory to the finish of said memory, then returning to the start of said memory, and so on;

reading said digital video signal from said memory at said standard speed, reading normally lagging behind writing by an amount substantially equal to the capacity of said memory;

cut editing the read digital video signal by step reducing said amount by which said reading lags behind said writing; and subsequent to a cut edit reducing the reading speed below said standard speed until the amount by which reading lags behind writing is restored to said normal amount.

According to the present invention there is also provided a digital video signal processing apparatus comprising:

a random access memory capable of storing a segment of an input digital video signal;

means to write said digital video signal into said memory at a standard speed, writing proceeding cyclically from the start of said memory to the finish of said memory, then returning to the start of said memory, and so on;

means to read said digital video signal from said memory at said standard speed, reading normally lagging behind writing by an amount substantially equal to the capacity of said memory;

means to cut edit the read digital video signal by step reducing said said amount by which reading lags behind writing; and means operative subsequent to a cut edit to reduce the reading speed below said standard speed until the amount by which reading lags behind writing is restored to said normal amount.

The above, and other objects, features and advantages of this invention will be apparent from the following detailed description of illustrative embodiments which is to be read in connection with the accompanying drawings.

BRIEF DESCRIPTION OF THE DRAWINGS

The invention will now be described by way of example with reference to the accompanying drawing, in which.

DESCRIPTION OF THE PREFERRED EMBODIMENTS

Before describing the embodiment, the operation of a memory forming part of the embodiment will be described with reference to FIGS. 1 and 2. The memory is a large random access memory (RAM) capable of storing a segment equal to several seconds, say five seconds, of an input digital video signal. That is, in a 50 Hertz television system, the RAM can store 125 frames, and in a 60 Hertz television system, the RAM can store 150 frames.

In the embodiment to be described below, an input digital video signal derived from a live source such as a video camera is continuously written into the RAM. The writing proceeds cyclically from the RAM start to the RAM finish, whereupon the writing immediately returns to the RAM start, and so on. At all times therefore the RAM is storing the last five seconds of the digital video signal.

Figure 1:
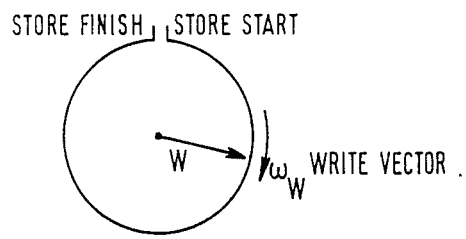
FIG. 1 shows diagrammatically the writing of a digital video signal into a memory.

This is represented in FIG. 1 where the RAM M 1 is indicated as a circular store and the write position is represented as a vector W rotating with an angular velocity $\omega_W$.

Due to the nature of the RAM 1, reading of the digital video signal can be effected independently of the writing.

Figure 2:
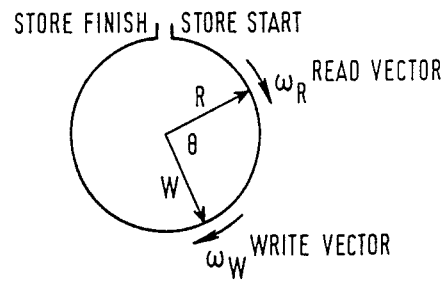
FIG. 2 shows diagrammatically the writing of a digital video signal into a memory and the reading of the digital video signal from the memory.

This is represented in FIG. 2 where additionally the reading position is represented by a vector R rotating with an angular velocity $\omega_R$. The relative angular velocity $\omega_\Delta$ between writing and reading is given by:

$$\omega_W = \omega_R + \Omega_\Delta \qquad (1)$$

If $\omega_R = \omega_W$ and reading is following writing at an angular distance $\theta$, then the delay in seconds in between writing and reading will be:

$$\theta \times n/360° \qquad (2)$$

where n is the store length in seconds, five seconds in the present example. $\theta$ can be selected to give a delay of any value up to the store length in seconds, and $\theta$ is preferably selected to give a delay of an integral number of frames, although it may be set to give a delay of an integral number of fields or even samples.

In the embodiment to be described, the RAM 1 forms part of a digital video signal processing apparatus which is interposed in the signal path between a video camera and a transmitter or a recorder, and which is operable to perform live cut editing. That is to say, small unwanted portions of the digital video signal can be cut from transmission or recording, the cut being made at least substantially imperceptible to a viewer.

To accomplish this, the RAM 1 is operated with $\omega_R = \omega_W$ and with $\theta$ equal to just less than 360°; that is, the maximum delay, five seconds in the present example, is used. In other words, at any given instant the oldest frame in the RAM 1 is being read. When the cut mode is triggered, $\theta$ is instantaneously changed to just more than 0° if a cut duration, in the present example, of five seconds is required, or to the appropriate angle between 360° and 0° if a cut of some lesser duration is required. Immediately thereafter $\omega_R$ is changed to $\omega_R - \omega_\Delta$, where $\omega_\Delta$ is a predetermined relative angular velocity, the value of which is selected to cause $\theta$ to increase back to just under 360° over a suitable time interval, which may, for example, be selected to be two minutes. $\omega_R$ remains unchanged throughout.

During the time interval while $\omega_R$ is equal to $\omega_R - \omega_\Delta$, the digital video signal will be read from the RAM 1 at a non-standard speed equal to:

$$(\omega_R - \omega_\Delta) \text{ normal speed}/\omega_R \qquad (3)$$

and to lock the read digital video signal to the system synchronizing signals it must be frame rate converted by adaptive interpolation filters of known form.

When $\theta$ again becomes equal to just less than 360°, the reading speed reverts to $\omega_R$, so as again to become equal to the writing speed $\omega_W$. If a further cut edit is required before this state is reached, then the duration of the cut is limited to that proportion of the store length represented by the current value of $\theta$.

Figure 3:
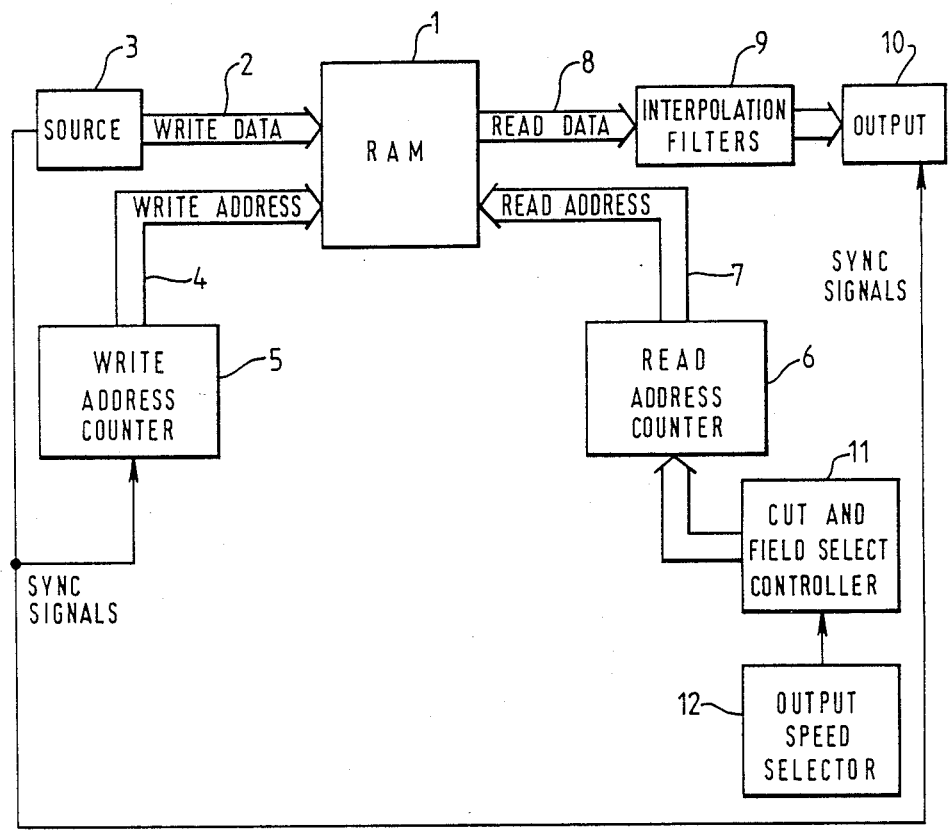
FIG. 3 shows in block diagrammatic form an embodiment of digital video signal processing apparatus according to the present invention.

Referring now to FIG. 3, the embodiment of digital video signal processing apparatus comprises the RAM 1, which receives the input digital video signal in the form of write data over a write bus 2. The write data is assumed to have been derived from a live source by a video camera and an analog-to-digital converter generally identified in FIG. 3 as a source 3. Writing in the RAM 1 is controlled by write addresses supplied over a write address bus 4 from a write address counter 5. The write address counter 5, like the source 3, is locked to system synchronizing signals, and writing in the RAM 1 proceeds continuously, and cyclically, at a real time constant speed which is determined by the system synchronizing signals.

Read out of the digital video signal is under the control of read addresses supplied to the RAM 1 from a read address counter 6, over a read address bus 7. The read digital video signal is supplied over a read data bus 8 to adaptive interpolation filters 9. The read addresses supplied by the read address counter 6 are field-based, that is to say, they cause reading by the RAM 1 of the data relating to the field nearest to the field addressed. In normal operation, when reading is proceeding at the same speed as writing, this means that a complete sequence of fields is read in the correct order from the RAM 1, and these fields are passed unchanged by the interpolation filters 9 to an output 10 which may be a digital-to-analog converter and a transmitter, or a recorder.

The apparatus further comprises a cut and field select controller 11 which supplies read address controls to the read address counter 6, and field polarity information to the interpolation filters 9. Finally, an output speed selector 12 is provided to control the cut and field select controller 11.

The operation is as follows. When a cut edit is to be effected, the cut and field select controller 11 is controlled to cause the read address counter 6 to jump the read addresses by the required amount, that is, in the terminology of FIGS. 1 and 2, to change $\theta$, usually, but not necessarily, to just more than 0°. Thus, the unwanted segment is cut from the digital video signal read out over the read data bus 8 and supplied to the interpolation filters 9. Immediately thereafter the output speed selector 12 controls the cut and field select controller 11, which in turn controls the read address counter 6 to slow the reading speed until reading again lags behind writing by the required amount, normally the full capacity of the RAM 1, or, in the terminology of FIGS. 1 and 2, until $\theta$ is again equal to just less than 360°.

The rate at which this is done may be fixed by the output speed selector 12, or the output speed selector 12 may include a variable control permitting the rate to be varied; but the rate will normally be selected to be such that the effect is imperceptible to a viewer, and it may, for example, be arranged that reading from the RAM 1 is restored to the normal condition over a time interval of two minutes. During this interval, the read data bus 8 will be supplying fields of the digital video signal to the interpolation filters 9 at a non-standard rate, while the cut and field select controller 11 will be supplying field polarity information to the interpolation filters 9. During this interval, therefore, the interpolation filters 9 are operative to interpolate fields as necessary to provide a continuous sequence of frames, at the frequency determined by the system synchronizing signals, to the output 10.

The times and frequencies above are, of course, given purely by way of example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim

1. A method of processing a digital video signal, the method comprising the steps of:
- storing a segment of an input digital video signal in a random access memory;
- repetitively writing said input digital signal in said memory at a standard speed, said writing proceeding cyclically from the start of said memory to the finish of said memory, then returning to the start of said memory;
- reading said digital video signal from said memory at said standard speed, said reading normally lagging behind said writing by an amount substantially equal to the capacity of said memory;
- effecting a cut edit of the read digital video signal by step reducing said amount by which said reading lags behind said writing; and
- subsequent to said cut edit, reducing the reading speed below said standard speed until the amount by which said reading lags behind said writing is restored to said normal amount.

2. A method according to claim 1 wherein, while being read at said reduced reading speed, said read digital video signal is supplied to interpolation filters to restore the frame frequency of said read digital video signal to the frame frequency corresponding to said standard speed.

3. A method according to claim 1 wherein said segment corresponds to several seconds.

4. A method according to claim 1 wherein said input digital video signal is derived from a live source.

5. A method according to claim 1 wherein said read digital video signal is transmitted or recorded.

6. A digital video signal processing apparatus comprising:
- a random access memory for storing a segment of an input digital video signal;
- means for repetitively writing said digital video into said memory at a standard speed, said writing proceeding cyclically from the start of said memory to the finish of said memory, then returning to the start of said memory;
- means for reading said digital video signal from said memory at said standard speed, said reading normally lagging behind said writing by an amount substantially equal to the capacity of said memory;
- means for effecting a cut edit of the read digital video signal by step reducing said amount by which said reading lags behind said writing; and
- means operative subsequent to said cut edit for reducing the reading speed below said standard speed until the amount by which said reading lags behind said writing is restored to said normal amount.

7. Apparatus according to claim 6 further comprising interpolation filters to which said read digital video signal is supplied to restore the frame frequency of said read digital video signal to the frame frequency corresponding to said standard speed.

8. Apparatus according to claim 6 wherein said segment corresponds to several seconds.

9. Apparatus according to claim 6 wherein said input digital video signal is derived from a live source.

10. Apparatus according to claim 6 wherein said read digital video signal is transmitted or recorded.

* * * * *